(12) United States Patent
Lutze et al.

(10) Patent No.: US 6,224,090 B1
(45) Date of Patent: *May 1, 2001

(54) AIRBAG COVER

(75) Inventors: Walter Lutze; Ulrich Schuster, both of Jena; Frank Schmieder, Bürgel; Dieter Franz; Rainer Schulze, both of Jena, all of (DE)

(73) Assignee: Jenoptik Aktiengesellschaft, Jena (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/924,222

(22) Filed: Sep. 5, 1997

(30) Foreign Application Priority Data

Sep. 7, 1996 (DE) .............................. 196 36 428

(51) Int. Cl.⁷ .................................................. B60R 21/20
(52) U.S. Cl. .................................................. 280/728.3
(58) Field of Search ............................... 280/728.3, 731, 280/732

(56) References Cited

U.S. PATENT DOCUMENTS

| | | | |
|---|---|---|---|
| 5,060,971 | 10/1991 | Nanbu et al. | 280/728.3 |
| 5,292,150 | 3/1994 | Watanabe et al. | 280/728.3 |
| 5,316,822 | 5/1994 | Nishijima et al. | 280/728.3 |
| 5,524,923 | 6/1996 | Henseler | 280/728.3 |
| 5,533,748 | 7/1996 | Wirt et al. | 280/728.3 |
| 5,582,424 | 12/1996 | Okuyama et al. | 280/728.3 |

FOREIGN PATENT DOCUMENTS

| | | |
|---|---|---|
| 3315535 | 3/1984 | (DE) . |
| 3904977 | 1/1990 | (DE) . |
| 4137926 | 5/1992 | (DE) . |
| 4418583 | 3/1995 | (DE) . |
| 9540563 | 5/1997 | (DE) . |

*Primary Examiner*—Peter C. English
(74) *Attorney, Agent, or Firm*—Reed Smith LLP

(57) ABSTRACT

An airbag cover in a dashboard, a steering wheel hub cover, or door panel with at least one predetermined breaking line whose shape is substantially determined by a line-shaped weakened portion. The line-shaped weakened portion is a perforation line extending until approximately below the surface visible to the vehicle passengers. This perforation line is advantageously a curve alternating around the predetermined breaking line and is at least similar in shape to the structure of the visible surface.

3 Claims, 2 Drawing Sheets

AIRBAG COVER

BACKGROUND OF THE INVENTION a) Field of the Invention

A great variety of types and constructions of line-shaped weakened portions are introduced in a wide variety of materials for the production of predetermined breaking lines. Probably the most frequently used type is a perforation line penetrating the material. The geometry and dimensions of the alternating through-holes and webs are selected depending on the strength of the material, the planned use and the production technique. Continuous perforation lines are often applied, for example, in the manufacture of packaging products, in the production of continuous rolls of forms or blocks of postage stamps. In the applications mentioned above, the parts of the material adjoining the perforation line are generally effectively separated from one another by deliberate application of force in the direction of the perforation line. Consequently, the straight line is compulsorily the optimal line shape for carrying out the severing with a fluid motion and with uniform force. As a rule, the fact that the perforation line is visible by the naked eye is advantageous and obviates additional marking of the line-shaped weakened portions, e.g., by printed marks.

Another type of line-shaped weakening is the embossed line which, however, allows only a slight weakening of material and is limited to a few materials such as paper. The lines are also straight lines in this instance and are visible with the naked eye.

The production of line-shaped weakened portions by means of deep cuts is used primarily when the predetermined breaking line should be invisible, e.g., in an airbag cover. The airbag can be arranged under the dashboard, below the steering wheel hub or door panel, for example. For the purposes of the following discussion, all conceivable flat bodies behind which or under which the airbag can be located are referred to as airbag sheathing. By airbag cover is meant the surface in the airbag sheathing which is removed or destroyed during the unfolding of the airbag so that an opening is formed for the airbag to pass through. For cosmetic reasons, however, it is desirable that this airbag covering in the airbag sheathing is invisible to the naked eye. Nevertheless, for the sake of completeness, the known solutions in which the airbag covering is realized in a manner other than by deep cuts in the airbag sheathing will be mentioned herein.

b) Description of the Related Art

It is known that manufacturers create the airbag cover in that the airbag sheathing is cut out on the desired predetermined breaking line and is then closed with a cover. A solution of this kind is sometimes considered unappealing in a cosmetic sense and is very cost-intensive.

Other manufacturers cut the airbag cover in the airbag sheathing in the desired contour and then cover the airbag sheathing and the airbag cover which is reinserted therein with a thin sheet whose strength and material characteristics are so dimensioned that this sheet tears in case of need. The disadvantage in this solution consists in that the thin sheet is located in the created cut gap, so that the contour of the airbag cover is clearly visible. Further, the desired breaking resistance is only possible by appropriate selection of the sheet and its material characteristics and strength. When a conventional wear-resistant or long-wearing sheet is used, the tearing behavior is correspondingly poor.

The production of the airbag cover by arranging line-shaped weakened portions in the otherwise finished airbag sheathing is more economical than the production process mentioned above. Various processes are known for producing line-shaped weakened portions in the airbag sheathing by cutting and will be considered in more detail hereinafter.

As was already mentioned, it is also known to arrange line-shaped weakened portions by means of incisions in the otherwise finished airbag sheathing.

There are airbag sheathings formed of one-layer plastic material or of two-layer laminated material, e.g., with an inner layer of low-density polyethylene foam and an outer layer of high-density polyethylene foam as is described in U.S. Pat. No. 4,120,516. In order to produce line-shaped weakened portions in this laminated material, the laminated material is cut from the inside out by means of cutting blades. The cut is accordingly made through the low-density foam into the relatively high-density foam. The high-density foam can be supported on a supporting surface so that pressure can be exerted by the cutting blades without leading to problems in producing the cuts and without the pressure producing press marks in the outer skin of the outer layer which will become visible subsequently.

For passenger vehicles in the upper price classes, the material of the airbag sheathing is often a reverse sandwich construction. The inner layer which gives shape and stability to the airbag sheathing is a plastic layer or resin fiber layer of high density. To this layer is applied a foamed material layer of low density which is covered by plastic sheeting. In order to make a deep cut in such a material construction according to the method described in U.S. Pat. No. 4,120,516, the foamed material layer would have to be compressed. This would make it considerably more difficult to produce a cut of definite depth. Further, permanently visible marks could be made on the plastic sheeting side. DE 44 09 405 proposes a method for producing an airbag cover in which the airbag sheathing is formed of an inner shaped layer of relatively hard polymer material and an outer layer of relatively soft polymer material. For this purpose, a cut line is to be inserted proceeding from the inner shaped layer which completely penetrates the inner shaped layer without exerting pressure on the airbag sheathing. The cut is advantageously made by means of a laser and also extends along a determined depth in the outer layer.

In order to allow the airbag to unfold reliably and within the shortest time in case of need, it is important that the required breaking force is constant and as small as possible along the entire line of weakened material. The breaking force to be applied is determined substantially by the strength of the material itself and by the material strength in the area of the line-shaped weakened portion. Therefore, in a sandwich construction which terminates on the driver's compartment side in a long-wearing fixed sheet, it is necessary to introduce the line-shaped weakening into the sheet. However, this results in high thermal loading, heating and consequently softening of the sheet. As a result, the sheet might possibly settle in the cut gap so that the line-shaped weakening is visible as a recess from the driver's compartment side. The same thing occurs in the case of thinner or soft sheets, also because the deep cut made by means of a laser only extends below the sheeting.

Often the course of the predetermined breaking line is identical to the contour of the airbag cover, wherein the line-shaped weakening forms the circumference of the airbag cover. The line-shaped weakening can then be a rectangle, for example, or its configuration can be adapted to the shape of the airbag sheathing, as is shown, for example, in DE 44 09 405, to the size and shape of a steering wheel hub.

EP 0648 646 A1 discloses an airbag cover in which the line-shaped weakening does not conform to the circumference of the airbag cover as described above, but rather in which the line-shaped weakening runs from the corners of the airbag cover to the surface center of gravity. When the airbag opens, the airbag cover is therefore torn from its surface center of gravity. As follows from the description of the prior art in EP 0648 646 A1, other "patterns" of line-shaped weakened portions which determine the predetermined breaking contour are also known in airbag covers. Also, in the known "H" or "X" patterns mentioned herein, the line-shaped weakened portions like the predetermined breaking lines are essentially straight-line deep cuts. Regardless of the production technique and patterns of deep cuts, there is a risk that the deep cuts will be visible to the passengers of the vehicle due to thermal loading during production and due to long-term influences (temperature, material aging, light, etc.).

OBJECT AND SUMMARY OF THE INVENTION

The primary object of the present invention is to provide an airbag cover in which the airbag cover in the airbag sheathing is only barely visible or not at all visible to the passengers of the vehicle throughout the life of the vehicle.

This object is met by an airbag cover in accordance with the invention wherein the line-shaped weakening is a perforation line which incompletely penetrates the airbag sheathing, i.e., a line of blind holes adjacent to one another in a row, between which there remain webs which act as supports for the surface layer. Depending on the desired breaking force and the material parameters, the machining depth and the diameter and spacing of the perforation holes are fixed by techniques known to the person skilled in the art. The airbag cover according to the invention is particularly advantageous when the airbag sheathing is formed of a plurality of layers, wherein the layer which is visible from the driver's compartment is a plastic sheet and the line-shaped weakening is produced by laser. In order to break the line-shaped weakening with a small force, the perforation holes must be cut as deeply as possible in a high-strength and accordingly long-wearing plastic sheet. However, the thinner the residual wall thickness remaining at the bottom of the perforation hole, the greater the risk that material deformations which become visible in a conventional straight-line weakened portion will occur owing to the loading mentioned above. Owing to the fact that the breaking of the line-shaped weakening in an airbag cover is not effected, as in other predetermined breaking contours, by the application of force in the direction of the line-shaped weakening, which requires or at least makes it advantageous that the line-shaped weakening extends in a straight line, and in view of the knowledge of the resolution capability of the human eye which depends on the object structure or texture, a second inventive idea concerns the configuration of the line-shaped weakening. According to the invention, the line-shaped weakening is produced in such a way that it diverges from the predetermined breaking line, namely in such a way that it extends alternately about the desired predetermined breaking line. Since it is least noticeable, a stochastic line configuration is particularly advantageous. However, defined curving paths such as sine-shaped, sawtooth-shaped or serpentine configurations are also advantageous when the surface is similarly structured.

The invention will be explained more fully in the following with reference to the drawings.

DESCRIPTION OF THE PREFERRED EMBODIMENTS

In a first embodiment example, the airbag cover is located in a dashboard formed of composite material. The composite material is formed of 3 layers, a wood-fiber layer (shaped layer) imparting shape and stability to the dashboard, a foamed material layer, and a plastic layer. The plastic layer has a low tearing resistance so that a perforation depth of the line-shaped weakening that extends to the foamed material layer is adequate for breaking the line-shaped weakening reliably and quickly in case of need. Since the perforation line is produced by laser, the diameter of the occurring blind holes is very small at the bottom, so that the sheet remains taut in spite of thermal loading and long-term influences and does not settle into the perforation holes. The line-shaped weakening in this embodiment example is identical to the predetermined breaking line following the contour of the airbag cover. It can form a rectangle, for example, or can have another contour determined by the airbag itself or adapted to the shape and geometry of the dashboard. It is crucial that an opening is formed when the line-shaped weakening breaks, enabling the airbag to unfold without hindrance. Thus, the line-shaped weakened portions can also extend along the airbag cover so that the airbag cover is not broken out of the dashboard, but rather the latter is destroyed. In this case, the configuration of the predetermined breaking line determines the contour of the airbag cover, but is not identical to it.

While the cut depth and cut width are determining geometric parameters for the breaking force when line-shaped weakened portions are produced by means of deep cuts, the breaking force is determined by the perforation depth and the diameter of and spacing of the perforation holes when deep perforations are used. In this way, the affect of fluctuating material thickness on the breaking resistance of the line-shaped weakening is reduced.

In a second embodiment example, in contrast to the first embodiment example, the plastic sheet is very resistant to tearing and has an optionally structured surface.

Figure 4:
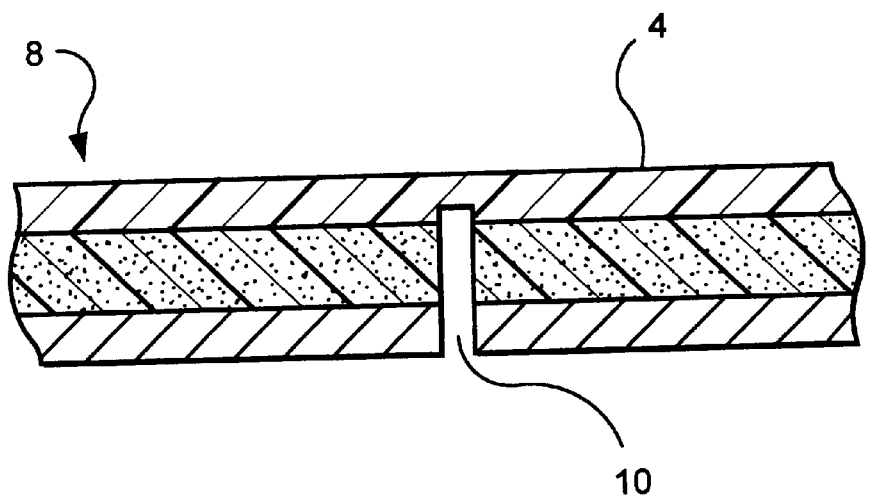
FIG. 4 shows a perforated composite material.

In order to achieve a low breaking resistance of the line-shaped weakening, the composite material is perforated to a depth in the plastic sheet until a residual sheet thickness of approximately 0.1 mm. A cross-section of the composite material 8 with a perforation 10 is shown (not to scale) in FIG. 4. Above the perforation holes, the plastic sheet is very thin and there is a risk that this plastic sheet will cling to the perforation holes. In order to minimize the visibility of the depressions which may possibly be formed, the line-shaped weakening is deliberately configured so as to deviate from the predetermined breaking line.

The line-shaped weakening alternates stochastically around the desired predetermined breaking line, wherein the deviations relative to the predetermined breaking line are small in proportion to its length.

Figure 3:
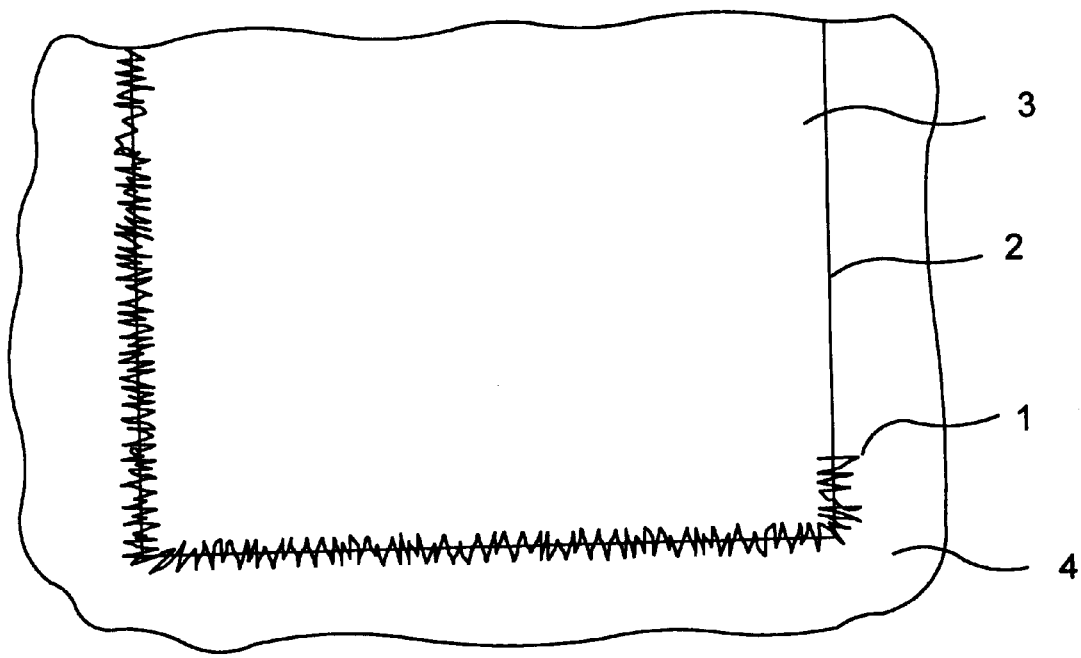
FIG. 3 shows a line-shaped weakening with a configuration according to FIG. 1a around a predetermined breaking line forming a rectangle.

FIG. 3 shows a line-shaped weakening 1 of this kind around a predetermined breaking line 2 identical to a rectangle. The predetermined breaking line 2 corresponds to the contour of the airbag cover 3 in the airbag sheathing 4. The air bag sheathing 4, which is visible to the vehicle passengers, has a three-dimensional structure.

Further advantageous line-shaped weakening configurations are shown in FIG. 1. They are suited to a greater or lesser degree depending on the surface structure of the airbag sheathing.

Figure 1A:
FIGS. 1 a–f show the line-shaped weakening in various configurations.
Figure 1B:
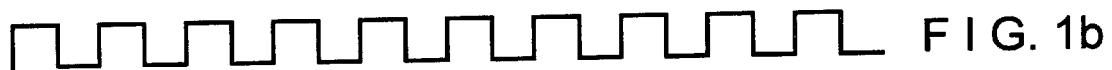
Figure 1C:
Figure 1D:
Figure 1E:
Figure 1F:
Figure 2:
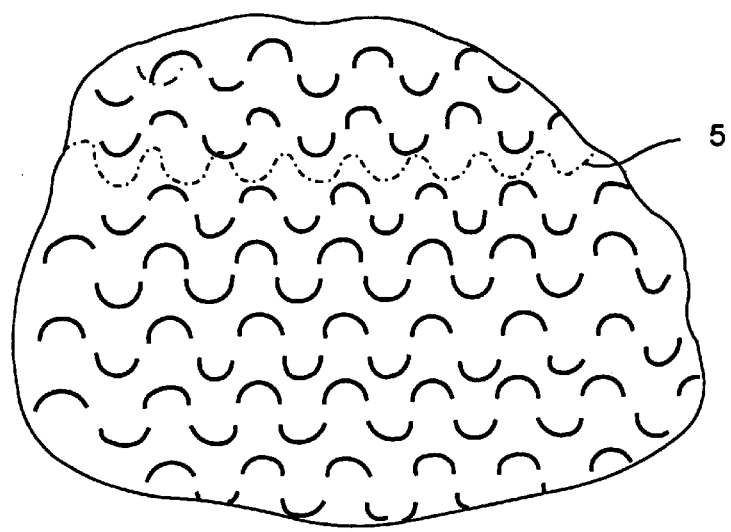
FIG. 2 shows a line-shaped weakening with a configuration according to FIG 1d, shown on a similarly structured surface.

FIG. 2 shows a line-shaped weakening 5 according to FIG. 1*d* on a surface similar to the line-shaped weakening configuration.

While the foregoing description and drawings represent the preferred embodiments of the present invention, it will be obvious to those skilled in the art that various changes and modifications may be made therein without departing from the true spirit and scope of the present invention.

What is claimed is:

1. In an airbag cover formed by at least one line-shaped weakened portion determining a predetermined breaking line in an airbag sheathing which is formed of at least two different material layers, wherein the layer facing vehicle passengers is a sheet, the improvement comprising that said line-shaped weakened portion is a perforation line which penetrates the airbag sheathing until near the surface which is visible to the vehicle passengers, so that the line-shaped weakened portion has webs at uniform intervals which support the sheet and thus prevent the sheet from settling into said line-shaped weakened portion, and the perforation line has a stochastic configuration alternating around the predetermined breaking line.

2. The airbag cover according to claim 1, wherein the surface of the airbag sheathing which is visible to passengers of a vehicle has a three-dimensional structure.

3. The airbag cover according to claim 2, wherein deviations of the perforation line from the predetermined breaking line are substantially smaller than a length of the predetermined breaking line and the configuration of the perforation line is substantially similar to the surface structure.

\* \* \* \* \*